March 18, 1969        G. ECK        3,433,543
AXIAL THRUST BEARING HAVING ROTATABLE NEEDLE CAGE
Filed Jan. 5, 1967
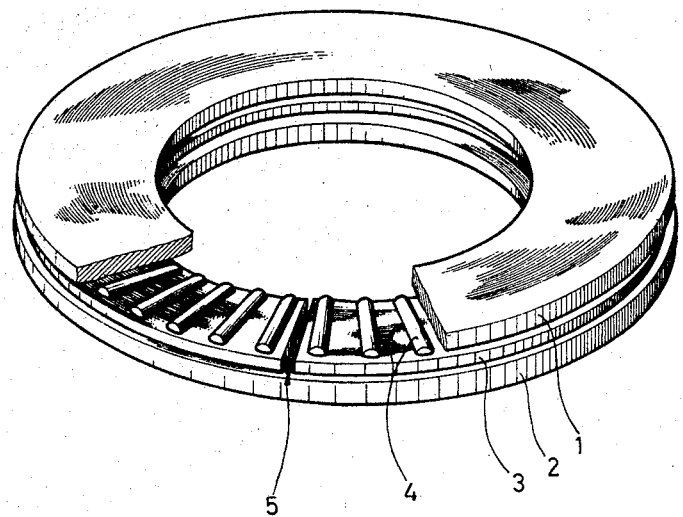
INVENTOR
Gerhard Eck
By *McGlew and Toren*
ATTORNEYS

United States Patent Office 3,433,543
Patented Mar. 18, 1969

3,433,543
AXIAL THRUST BEARING HAVING ROTATABLE NEEDLE CAGE
Gerhard Eck, Munich, Germany, assignor to Bolkow Gesellschaft mit beschrankter, Haftung, Ottobrunn, near Munich, Germany
Filed Jan. 5, 1967, Ser. No. 607,568
Claims priority, application Germany, Jan. 14, 1966, B 85,406
U.S. Cl. 308—235                    4 Claims
Int. Cl. F16c 33/46

ABSTRACT OF THE DISCLOSURE

A single embodiment of a new and useful axial antifriction bearing is shown in the drawings and described herein. The antifriction bearing is particularly adaptable for constructions which require small swinging movements under high axial load. In accordance with the invention, the bearing consists of inner and outer races with a ring cage disposed therebetween having needle bearing members which are mounted for rotation about axes which extend substantially radially. The central ring cage is provided with a separating joint or opening which extends substantially in a radial direction in the preferred form. By this arrangement, the needle cage is forced to rotate and thus insures that the bearing surfaces will not become pivoted in a relatively short time because the needles are permitted overall and swinging movements or rotation by more than 360°.

Brief summary of the invention

The invention relates, in general, to the construction of bearings and, in particular, to a new and useful axial antifriction bearing having a needle bearing cage with a gap or separation.

The present invention is particularly applicable for axial antifriction bearings to accommodate small swinging movement of the parts under relatively high axial load and has particular application to axial needle bearings where the needles are arranged between two bearing surfaces and guided and held in a ring-shaped cage.

Antifriction bearings of the above type have the disadvantage that the needles cannot overroll in swinging movements, that is, a rotation of more than 360° is not possible. Therefore, depending upon the load, the corresponding bearing surfaces will become pitted in a relatively short time between the needle circumference and the rolling track. This results in an unsteady run of the supported parts and may cause severe damages.

The disadvantages of the prior art constructions can be eliminated by providing mechanical means by which the needle cage is forced to rotate but the use of such mechanical means is relatively expensive and takes up much space so that the attainable result is not proportional to the means which must be expended.

In accordance with the present invention, there is provided an axial antifriction bearing which includes inner and outer races with a central ring-shaped cage disposed therebetween for needle bearings which includes a separating joint. According to another feature of the invention, the separating joint is arranged substantially in a radial direction. With a construction of this nature, the cage will rotate even in small swinging movements so that the rolling surfaces of the needles will not become pitted.

With the construction of the invention, the ring cage breathes with each swinging movement. Due to the difference between the outer and inner track speeds, the needles slide. The rolling speed at the outer end of the needles is lower than the track speed while it is higher at their inner ends. This difference forces the needle to travel. The resulting forces produce bending moments which deform the cage, the needles describing sliding movements with regard to the bearing surfaces corresponding to the bending form. This has the effect that the needles do not always roll off on the same partial surfaces. The cage thus rotates and with each swinging movement will vary the contact points between the needle superfices and the rolling tracks on the bearing surfaces.

Accordingly, it is an object of the invention to provide an improved axial antifriction bearing which includes a central bearing cage for needle bearings which is formed with an open gap.

A further object of the invention is to provide an axial thrust bearing permitting swing movements of the parts which includes inner and outer race elements with a central substantially flatbearing cage having a plurality of needle bearings which are mounted for rotation about substantially radially extending axes and wherein the cage is formed with the radially extending separating gap.

A further object of the invention is to provide an axial thrust bearing which is simple in design, rugged in construction and economical to manufacture.

The various features of novelty which characterize the invention are pointed out with particularity in the claims annexed to and forming a part of this specification. For a better understanding of the invention, its operating advantages and specific objects attained by its use, reference should be had to the accompanying drawings and descriptive matter in which there is illustrated and described a preferred embodiment of the invention.

Brief description of the drawing view

The only figure of the drawing is a top perspective view, partially broken away, of a bearing assembly constructed in accordance with the invention.

Detailed description

Referring to the drawing, in particular, the invention embodied therein comprises an axial antifriction bearing which includes races 1 and 2 and an interposed ring cage 3 having needles 4. In the ring body 3 of the ring cage there is provided a separating joint or gap 5. In accordance with the preferred arrangement, the separating joint 5 is made to extend in a radial direction. The needle bearings 4 are rotatably mounted for rotation about axes which extend substantially radially. With the construction outlined, a constant rotary movement of the cage 3 and thus of the needle 4 is enforced, even with a swinging load acting on the bearing.

While a specific embodiment of the invention has been shown and described in detail to illustrate the application of the inventive principles, it will be understood that the invention may be embodied otherwise without departing from such principles.

What is claimed is:
1. An axial antifriction bearing for applications in which the bearing will be subject to small swinging movement under high axial load, particularly axial needle bearings, including first and second outer bearing races, and a central ring-shaped cage disposed between said races having a plurality of needle bearings rotatably mounted in said central cage, said cage being characterized by having a single open gap extending completely thereacross from the inner edge to the outer edge.

2. An axial antifriction bearing according to claim 1, wherein said separating joint is arranged substantially in a radial direction.

3. An axial antifriction bearing comprising first and second substantially flat annular outer races, a substantially flat cage disposed between said races, a plurality of needles rotatably mounted on said cage for rotation about substantially radial axes, said cage having a single separation extending therethrough from its outer periphery to its inner periphery.

4. An axial antifriction bearing according to claim 3, wherein said separation of said cage extends substantially radially.

References Cited

UNITED STATES PATENTS 2,724,625  11/1955  White _____ 308—235

FOREIGN PATENTS 467,936  9/1950  Canada.

MARTIN P. SCHWADRON, *Primary Examiner.*

FRANK SUSKO, *Assistant Examiner.*